Jan. 26, 1971  J. H. LEMELSON  3,557,407
APPARATUS FOR SURFACE FORMING SHEET MATERIAL
Filed Aug. 19, 1968  2 Sheets-Sheet 1

INVENTOR.
Jerome H. Lemelson

United States Patent Office 3,557,407
Patented Jan. 26, 1971

3,557,407
APPARATUS FOR SURFACE FORMING SHEET MATERIAL
Jerome H. Lemelson, 85 Rector St., Metuchen, N.J. 08840
Continuation-in-part of application Ser. No. 574,416, Aug. 23, 1966. This application Aug. 19, 1968, Ser. No. 753,530
Int. Cl. B29d 7/14
U.S. Cl. 18—10                     4 Claims

ABSTRACT OF THE DISCLOSURE

An apparatus and method for forming irregularities in the surface of a sheet of material by working said surface with a plurality of protrusions extending outwardly from the surface of a rotary die or drum. In one form, a plurality of needle or spine-like members or formations are provided in the outer surface of a drum and a sheet of material to be formed is fed to and compressed against the surface of the drum as the drum is power rotated in a manner to cause penetration of said spine like members into the surface strata of the sheet causing them to lift portions of the material of the sheet outwardly from the sheet without detatching said portions from the sheet. The sheet may be presented at ambient or elevated temperature to facilitate the deforming of the portions penetrated by the drum formations. If at ambient temperature, the sheet may comprise a metal or polymer. By elevating the temperature of a sheet of polymeric material, it may be softened to a degree whereby the drum protruding formations dip into the surface of the sheet and remove portions therefrom with little resistance to said action. Cooling means is provided to rapidly solidify or set the surface of the sheet before the formations so formed flow back into the surface of the sheet. Plate or sheet made of metal such as aluminum may also be heat softened below its melting point prior to being so deformed to facilitate the deformation thereof.

RELATED APPLICATIONS

Figure 1:
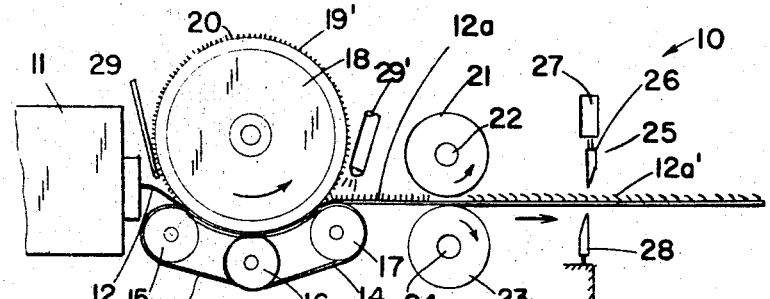

This is a continuation-in-part of application Ser. No. 574,416, filed Aug. 23, 1966 copending at the time of filling this application, now U.S. Pat. 3,399,425 which issued on Sept. 3, 1968 and having as a patent application Ser. No. 249,921, filed Jan. 7, 1963 and entitled Method and Automatic Apparatus for Producing Pile-Surfaced Plastic Sheeting now U.S. Patent 3,275,487.

SUMMARY OF THE INVENTION

This invention relates to an apparatus and method for surface forming sheet material with a plurality of irregular surface formations operative to impart certain characteristics to the sheet which are not inherent in the sheet as formed. While the invention is primarily concerned with the surface forming of certain flexible materials such as flexible polymers, the apparatus and method defined herein may also be operative to improve or change the physical characteristics of more rigid materials such as rigid polymers, metals and other materials which are deformable or may be rendered deformable in a manner to permit portions of the surface stratum thereof to be virtually lifted away from the surface without complete detachment therefrom to provide a plurality of surface formations which may vary in shape from filamentary formations to cantelevered fingers or barbs.

It is known in the art to provide a pile-like finish on the surface of a sheet by flocking or by embossing said surface. Shortcomings of the materials derived from these techniques include not only the cost and complexity of the finishing procedures but limitations in the surface finishes which may be derived. The application of flock to a plastic member requires not only the use of specially prepared flocking but also the use of costly adhesives and preparation techniques. The pile-like surface effects produced by embossing are extremely limited as to shape and size of the pile. Accordingly, it is a primary object of this invention to provide a new and improved apparatus and method for surface forming sheet material with a multitude of protruding elements formed of the material of the sheet.

Another object is to provide apparatus and method for producing new and improved sheet materials and the materials produced therefrom.

Another object is to provide an apparatus for producing a pile-like plastic sheet material made entirely of a single polymer by continuously deforming a sheet forms of said polymer.

Another object is to provide an apparatus and method for producing a sheet material having a multitude of surface formations protruding outwardly therefrom which serve to provide a cushion-like matte against said surface, the construction of said material also being defined as an object of the invention.

Another object is to provide an apparatus and method for working sheet metal to provide a multitude of surface formations therein which are capable of abrading or retaining other materials against said surface.

Another object is to provide new and improved structures in sheet materials having surface formations formed of the outer stratum of the sheet material.

With the above and such other objects in view as may hereinafter more fully appear, the invention consists of the novel constructions, combinations and arrangements of parts and methods of fabrication which will be hereinafter more fully described and illustrated in the accompanying drawings, but it is to be understood that changes, variations and modifications may be resorted to which fall within the scope of the invention as claimed.

Figures 3, 4:
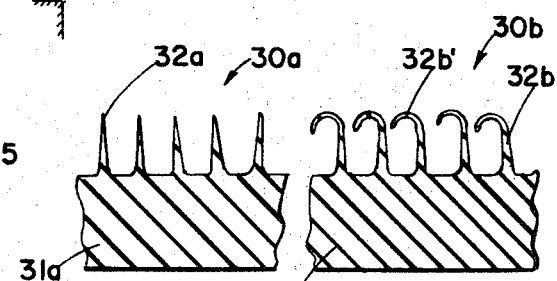
Figure 2:
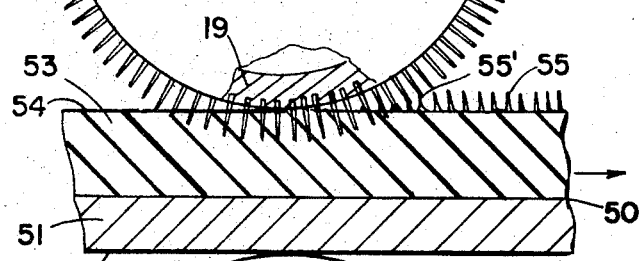
Figure 5:
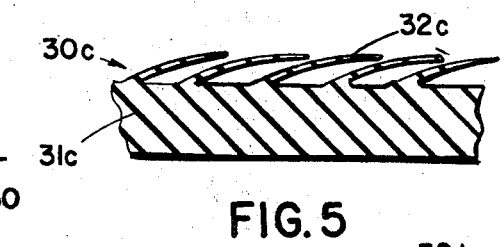
Figure 6:
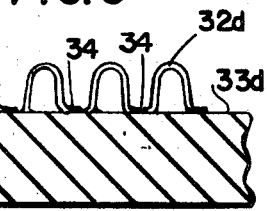
Figure 7:
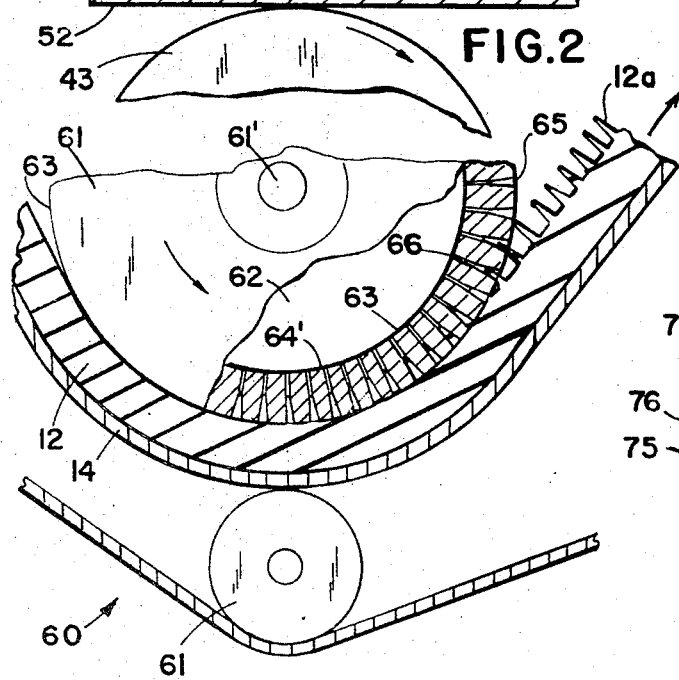
Figure 8:
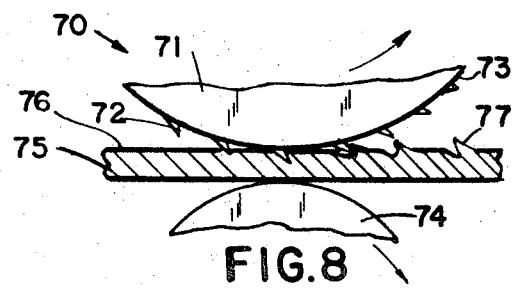
Figure 9:
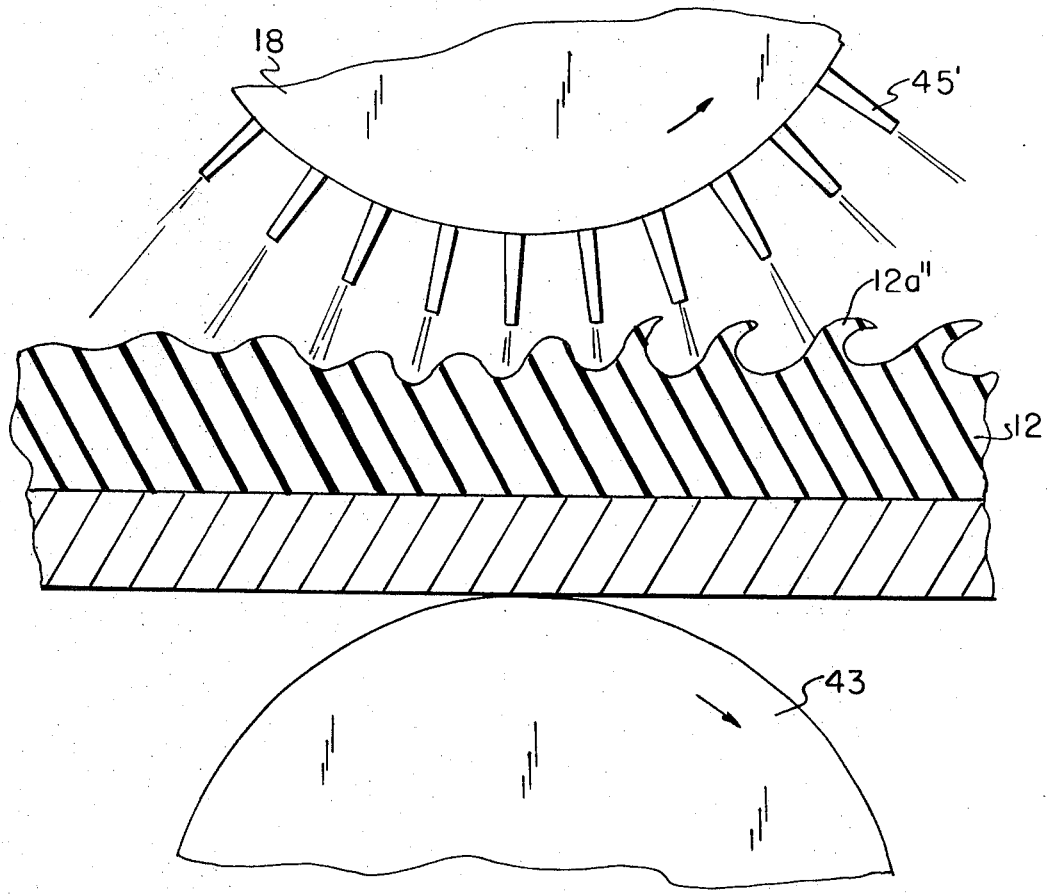

In the drawings which form part of the description:
FIG. 1 is a schematic representation of an apparatus for continuously producing a sheet of material having a filamental or pile-like surface by continuously deforming said surface while in a molten condition;
FIG. 2 shows in side view, a modified form of the apparatus disclosed in FIG. 1;
FIG. 3 is an end view of a fragment of material producible by means of apparatus of the type illustrated in FIGS. 1 and 2;
FIG. 4 is an end view of a fragment of a modified form of the material shown in FIG. 3;
FIG. 5 is an end view of a fragment of another modified form of material producible by means of apparatus of the type shown in FIGS. 1 and 2;
FIG. 6 is an end view of a fragment of sheet material having a plurality of loop-like formations or filaments formed integral with or bonded to the surface of said sheet; and
FIG. 7 is a schematic representation of a modified apparatus applicable to the apparatus illustrated in FIG. 1 for producing a tufted or spiny surface in a sheet of formable plastic material, and
FIG. 8 is an end view of a modified form of apparatus of the type illustrated in FIGS. 1 and 2.
FIG. 9 is a partial side view of a modified form of the invention showing fluid means for deforming the material.

This invention is primarily concerned with the fabrication of new and improved sheet materials having at least one major surface formed with a multitude of individual formations protruding outwardly from said surface and preferably made of the material of the sheet or the surface strata thereof from which they protrude. In preferred forms of the invention, the sheet or portion thereof from which the individual formations protrude, is a flexible polymer such as vinyl, polyethylene, ethylene vinyl acetate or the like and the surface protrusions are filament-like in shape and closely spaced to provide a tufted or pile-like surface which is flexible and soft to the touch permitting use of the sheet against the human skin or springy in nature permitting the sheet to be used for many packaging, sound and vibration damping purposes, etc. The apparatus provided hereafter or modified versions thereof, may be used to produce sheet materials with protrusions of filament-like formations which vary from a few thousandths of an inch in diameter to 1/16" or greater in diameter and in length from about 1/32" to 1/4" or more depending on the application. The filament-like formations may be used as formed, trimmed by automatic means, curled or deflected or otherwise changed in shape downstream of the apparatus illustrated.

FIG. 1 illustrates an apparatus 10 for producing a sheet of material containing surface protruding formations such as spines or filaments on a continuous basis. The apparatus 10 includes extrusion means 11 for continuously forming a sheet 12 of thermoplastic material and feeding same directly against a processing roll or drum 18 which provides the desired surface formations 12a in at least one surface of the freshly formed sheet just after it emerges from the extruder 11 and is in a molten and easily formable condition. The sheet 12 is fed directly to the upper surface of the belt 14 of an endless belt conveyor 13 which is power operated to drive the belt 14 at substantially the speed of the extruding sheet and which belt is guided by a plurality of rollers 15, 16, 17 to retain sheet 12 against a portion of the peripheral surface 19 of a power rotated drum or roller 18 adapted to predeterminately form a plurality of spines or filaments 12a in the surface of sheet 12 and across said surface before the sheet is removed therefrom.

Situated beyond the forming apparatus 13, 18 are a plurality of rollers 21 and 23 which are operative to deflect the formations 12a in the surface of sheet 12 to provide formations thereof as will be hereinafter described. Notations 22 and 24 refer to the power operated shafts of rollers 21 and 23 and 20 to the power rotated shaft of drum 18. Located downstream of the forming means 21, 23 is a cutting apparatus 25 including a blade 26 driven by a servo device 27 such as a solenoid to cooperate with a second blade 28 in cutting predetermined lengths of sheet 12 without stopping the continuous process described.

Notation 29' refers to a heater such as a radiant heating element disposed immediately above sheet 12 for rendering the surface strata thereof to be deformed, molten just prior to engagement with the forming surface 19 of drum 18. Depending on the nature of the material being extruded to form sheet 12, the distance between the extruder 11 and the forming apparatus, the operating characteristics of said apparatus and the speed at which said material is extruded, the heating means 29' may or may not be required to render said sheet in a condition for forming same with a plurality of protruding spiny or filamental elements as will be hereafter described.

A number of techniques may be used for forming the molten surface of the sheet 12 and include the provision of short narrow needles or pin-like protrusions 19' extending outwardly from the main cylindrical surface 19 of the drum 18. The protruding elements 19' are forced into the molten material and each serve to pull a quantity of molten plastic out of the molten strata thereof into which the elements have been projected as the sheet 12 is removed from the surface 19 of the drum 18. By properly controlling the temperature of the plastic material comprising sheet 12, material in the shape of tapered spiny formations or filaments 12a protruding from the surface may be formed as an integral extension of the base sheet 12 which filaments 12a may be caused to solidify and retain either their shape as formed or a modification thereof. Accordingly, means such as one or more nozzles 29' may be employed to direct a heat transfer fluid such as air or liquid against either or both surfaces of sheet 12 after it is guided away from drum 18 to solidify or fuse same before the formations 12a have had an opportunity to sink back into the sheet 12. Again need for the coolant nozzles 29' may be eliminated depending on the condition of the sheet 12 upon leaving drum 18 its attitude with respect to the horizontal and the shape desired of the elements protruding from the surface 12'.

In one mode of operation, the belt 14 of conveyor 13 may be cooled by means of air or water sprays while drum 18 may be heated to render the surface strata of sheet 1a molten. The sheet 12 may thus also be fed from a roll and comprise thermoplastic material per se, or a lamination of thermoplastic material and another material such as another polymer, textile material, woven fabric, non-woven fabric, metal, paperboard, foamed plastic or other suitable base which may be roll fed and laminated to or extrusion coated with the material comprising the formable sheet 12.

While the sheet forming apparatus 10 of FIG. 1 includes a forming roll and endless conveyor which cooperate in forming 12, said apparatus may also comprise two endless conveyor belts or two power driven rollers between which the sheet 12 is driven and one of which contains protruding pin-like formations or otherwise-shaped irregular formations which are operative to each pull a small quantity of molten material from the surface strata as described. Furthermore, reciprocating platen means with pin-like protrusions may also be employed to form the sheet as described.

The apparatus of FIG. 1 may also contain a plurality of the drum and belt forming means 13, 18 of FIG. 1 longitudinally disposed to receive the sheet being formed one after the other so as to provide a greater density of surface formations in 12a in the sheet 12. In other words, one surface forming drum and belt means for retaining the sheet against its peripheral surface may first operate on a first surface of the sheet to form a first array of spaced apart protruding filaments therein while the second forming drum situated downstream of the first drum operates on portions of the surface of the sheet between the filaments formed by the first drum to form said unformed portions into other filaments of the same or different in shape than the first formed filaments.

There is shown in FIG. 2 a modified form of the apparatus of FIG. 1 for producing a sheet material having a tufted or filamented surface layer defined by a plurality of filaments made of the material of at least a portion of the sheet. The apparatus 40 includes a first rotating roll or drum 18 having a second rotating roll or drum 43 cooperating therewith in receiving and driving a sheet 50 therebetween. The material 50 may comprise a single sheet of material such as a thermoplastic polymer capable of being formed while at least a portion thereof is in a semi-molten condition. The sheet 50 illustrated in FIG. 2 comprises a multi-strata material including a base sheet or web 51 the lower surface 52 of which is engaged by the lower rotating drum 43. Disposed against and laminated or coated on the upper surface of base sheet 51 is a layer or sheet 53 of thermoplastic material having an upper surface 54 which faces the surface 19' of the drum 41 and preferably, although not necessarily, is compressively engaged thereby.

Disposed in a plurality of radial holes extending into the wall 19 of drum 18 are a plurality of rods or pointed pins 45 which project a short distance outwardly from surface and are operative to penetrate the thermoplastic material preferably while said material is in a molten or semi-molten condition. The needles 45 preferably are closely spaced across substantially the entire peripheral surface 19' of drum 41 or at least that portion of said drum which is desired to effect the formation of filaments of the surface layer of the material fed thereagainst.

As the sheet material 50 leaves the surface of drum 18, the needles serve to each draw a small amount of molten or semi-molten material from surface 54 of the feeding member or sheet 53 as illustrated by the partially drawn filament-like formations 55 and 55'. At a certain point beyond the drum 18, the drawn material separates from the pin 45 which is drawing same leaving a filament-like formation protruding outwardly from the surface 54. Depending on the thermoplastic polymer comprising sheet 50 or layer 53, control of the temperature gradient of said material from its location just prior to being fed to the bite of drums 18 and 43 to the location where the formations 55' separate from the pins 45 and beyond said location, will result in the formation of filaments of substantially predetermined shapes resulting in a web of material having a filamented surface suitable for various useful applications which will depend on the characteristics of the material so formed. If, for example, the material comprising member 50 or surface layer 53 is a flexible polymer such as plasticized polyvinyl chloride, low or medium density polyethylene, polypropylene, ethylene vinyl acetate or other suitable polymer or copolymer, the web material 50 may be utilized for various applications ranging from its use as a textile material in the production of clothing or other flexible articles, mats, floor or ground coverings such as rugs, artifiicial grass or the like, heat sealable components of inflatable articles, vibration dampening or packaging material, etc. If the material 50 or layer 53 thereof is semi-rigid or rigid in nature, the spine-like protrusions 54 may be used as brushing, scouring, friction-producing, abrasive or brushing elements of a belt, plate or otherwise shaped articles made therefrom.

If the sheet 50 is produced of a lamination or multi-layer formation of different materials, the base 51 may comprise a woven or non-woven fabric, flexible or rigid material such as plastic, paper, paperboard, metal or other sheet material which is coated with or laminated to the layer 53.

The apparatus of FIG. 2 preferably includes means for rendering the layer 53 or the upper strata thereof in a molten condition permitting the drawing of the filament-like formations 55 outwardly from the surface 54 as described. Accordingly, a suitable radiant heating means may be disposed on the upstream side of the drum 18 for rendering said plastic material molten. The drum 18 may also be heated by any suitable means so as to conduct and/or radiate heat to render a sufficient portion of the material 50 in a molten condition to permit the described formation of the upper surface thereof. In one form of the invention, the rolls or drums 18 and 43 may comprise components of a calendering apparatus operative to receive formable thermoplastic material and to form same into a sheet having one flat surface and the other surface containing a plurality of integral filaments or spiny formations as described.

In another form of the invention, the rolls 18 and 43 may be operative to receive a sheet of freshly extruded thermoplastic material formed per se or extrusion coated on or laminated to a second sheet such as 51 of FIG. 2 just prior to feeding same to the bite of the rolls 18 and 43. Accordingly, such extrusion may be carried out in a manner to provide layer 53 in a molten condition by the time the material reaches the forming apparatus so that it will not be necessary to heat the roll 18 or the material 53 just prior to entering the forming apparatus. Depending on the nature of the material being formed, it may be desirable to guide the sheet formation 53 so as to remain against an extended portion of the surface of drum 18 wherein said material will be rendered molten for the intended purpose.

FIG. 3 illustrates a fragment of a first form of sheet material 30a produced by apparatus of the type shown in FIGS. 1 and 2. The base sheet 31a is provided of any suitable flexible or rigid polymer and has formed integral therewith a plurality of closely spaced, substantially straight upwardly extending and slightly tapered filament-like formations 32a which extend over a substantial portion of the width of sheet 31a. The material 30a may be used for various different purposes depending on the flexibility of said material. The formations 32a may be rigid or semi-rigid and may serve such purposes as brushing elements, vibration damping means, packaging material and the like. More flexible formulations of thermoplastic materials utilized to form the member 30a may render said member suitable for use as carpeting, product trim or the like. The base 31a may also be made of a lamination or otherwise formed composite web as described.

In FIG. 4 is shown a modified form of the material illustrated in FIG. 3 which comprises a sheet-like formation 30b having a base portion 31b and a plurality of filament-like elements 32b the upper ends of which are curled exposing a greater portion of the side surfaces thereof and providing a different surface than provided by the formation of FIG. 3. The upper curled ends of elements 32b may be randomly or uniformly directed and may be a natural shape resulting from when the formations 32b pull away from the pins or needles used for forming same as illustrated in FIG. 2. If the material comprising formations 32b of FIG. 4 is rigid or semi-rigid plastic, said material may be utilized as a so-called hooking material wherein the looped or curled ends 32b' of the formations 32b will hook and hold a plurality of similar formations in another sheet thereof or modified forms of loops or broken hooks so as to serve as a fastener.

In FIG. 5 is shown a fragment of a modified form or filamented material 30c producible by means of apparatus of the type illustrated in FIG. 1. The filament-like formations 32c which extend outwardly from the base sheet 30c extend oblique to said surface in somewhat of a flattened or partially-flattened condition giving the effect of grass or hair formations. The formations 32c of FIG. 5 are produced by either guiding the sheet formed by the apparatus of FIG. 1 between a plurality of rollers either prior to solification of the material thereof after it is driven from the apparatus 13, 18 molten or by reheating the surface 12 of the filamented material and deflecting the filament elements 32 by means of a blast of a suitable fluid such as air or by passing same between rollers which are operative to deflect and permanently deform the elements 32 as illustrated.

In FIG. 6, a web or sheet 20d of material is formed as described and comprises a base sheet portion 21d from which upwardly protrudes a plurality of filament-like elements 23d which have been formed in the upper surface 22d of the sheet 21d as described. The formations 23d, after being formed, are either forced or permitted to droop by gravity before they completely solidify so that the end portions of each become welded to or fuse with the upper strata or surface layer of the material comprising sheet 20d. Notation 24 refers to the welded or integrally bonded end portions of the filament-like formations 23d. The surface of sheet member 21d is thus comprised of a plurality of loop formations defined by the filament-like formations 23d which have been drawn from or molded integral with the sheet. Such a structure may be used for abrading or scouring purposes. In still another application, the structure illustrated in FIG. 6 may be used as a component of a fastener system having another component shaped as in FIG. 4 and having a plurality of hook-like formations similar to 32b with hook-like or curled ends 32b' adapted to engage and hook the loop-formations 23d of FIG. 6 across the mating surfaces.

In another embodiment, it is noted that one or more sinusoidally formed filaments or wires of plastic or metal with a plurality of U-shaped loop-like formations therein, may be embedded in a molten sheet formation, upper strata or coating on a base sheet and retained thereagainst upon solidification of said molten material to provide substantially the structure illustrated in FIG. 6 which may be used for scouring purposes or as a component of a hooking material fastener as described.

FIG. 7 illustrates a portion of sheet forming apparatus similar to that illustrated in FIG. 1 but modified as to the means for forming the spine or filament-like formations in the sheet material. The apparatus 60 includes, in addition to means as described for supplying a sheet 12 of molten thermoplastic material or a lamination including same, to the space between a power operated roller or drum 61 and the belt 14' of an endless belt conveyor 14 which is operative to receive said sheet and compressively retain same against the cylindrical peripheral surface 64 of the wall 63 of drum 61. Radially provided through the wall 63 of drum 61 are a multitude of small holes 65 into each of which is forced a sufficient quantity of the molten sheet compressed against the drum or the molten upper strata sheet material being formed. Fine capillary holes 66 may be provided between the inner ends of the radial holes 65, which holes 66 extend to the inside surface 64' of the wall 63. Thus, if the interior 62 of drum 61 is connected to a source of negative pressure or vacuum, such as a vacuum pump, molten material from sheet 12 will be drawn by vacuum into the radial holes 65 to facilitate the formation of said spine or filament formations protruding from the surface of the sheet being formed. Accordingly, a vacuum pump system may be connected through a passageway in the axle or shaft on which drum 61 rotates to the interior volume 62 of the drum for providing negative pressure therein which will assist in drawing molten material into the radial cavities 65 extending from the outer surface 64 of the drum.

Depending on the characteristics of the material being formed, it may suffice to guide the conveyor belt 14 away from the surface 64 of drum 61 while the material in the cavities 65 is in a molten or semi-molten condition which may serve to further elongate the filaments before the material thereof is completely removed from said cavities as the sheet 12 is drawn further away from the drum 61. In other forms of the invention, the wall 64 of the drum may be cooled to facilitate and hasten solidification of the material forced into the cavities 65 and/or a coolant gas or liquid may be directed against belt 14' to further hasten solidification of the molten portions being formed.

The capillary holes 66 are preferably of such a dimension as to prevent the molten or semi-molten material entering the larger diameter holes 65 from passing through said capillary ducts 66.

In another form of the invention, the radial holes 65 may extend completely through the solid wall portion 63 of the drum and a liner of porous metal may cover the inside surface of the drum wall 63 and prevent the escape of molten material to the interior volume 62. In a preferred embodiment, the holes 65 are coated with a low-friction material such as Teflon or are highly polished and extended only partly through the wall 63 so that the filament or spine-like formations are formed entirely as the result of pressure exerted by belt 14' against the molten sheet material forcing portions of said material into the cavities 65 which portions become solidified therein as the drum rotates and are removed from each cavity as the sheet material 12 is drawn away from the surface 64 of the drum 61 as described.

FIG. 8 illustrates a modified form of the invention wherein the sheet forming drum is modified to form a plurality of different sheet materials with surface formations which are modified forms of the previously described structures. The apparatus 70 includes, in addition to features hereinabove described, a pair of cooperating rollers or drums 73 and 74 adapted to receive a sheet 75 of material to be formed between said rollers. Protruding outwardly from the surface 73 of the roller 71 and preferably extending across said surface about the complete periphery of the roller are a multitude of formations or elements 72 defining sharp teeth of wedge-like shape. Said teeth 72 are each adapted to be driven into the surface 76 of sheet 75 as the sheet is compressively driven through the rollers and, as the sheet 75 emerges from the rollers, to lift outwardly from said sheet and form a plurality of tapered formations 77 which protrude outwardly from said sheet as illustrated. The formations 77 may remain in the shape they are formed or may be further worked by automatically operating means situated down stream of the rollers 71 and 74 which may operate to deflect, curl, trim, grind or otherwise form same.

The sheet 75 may comprise a thermoplastic or thermosetting polymer, ceramic, metal or other material or composite or laminate. Said sheet may be fed to the power driven rollers 71, 74 as extruded or rolled in a softened or molten condition or in a fully solidified state. Depending on the material of sheet 75, the tooth-like formations 77 therein may be used to impart resiliency to the surface 76 particularly if the material comprising said sheet is a resilient or medium density polymer such as polyethylene, polypropylene or the like, or in the event that the material is metal or ceramic, may be used for abrading purposes or to enhance the adhesion or mechanical bonding of the surface 76 to other materials.

The teeth 72 protruding from surface 73 of drum 71 may be formed in the wall of the drum by the means described for forming sheet 75 prior to assembly of the drum, may be cast integral with said wall or may comprise teeth of a hard material such as titanium carbide, aluminum oxide or the like welded to or cast integral with the drum wall.

In a preferred form of the invention, sheet 75 may comprise a sheet of metal such as aluminum with the formations 77 having sharp edges and used for abrading purposes. If the sheet 75 is a thermoplastic material or metal provided in a molten condition at the bite of the rollers, the formations 77 may be drawn upwardly and curled in shape by the action of the teeth 72 which each serve to pull material off the surface of the sheet. The sheet 75 may also be driven by a pair of rollers or other means disposed downstream and/or upstream of the rollers 71, 74 at such a speed, lower than the rotational velocity of the surfaces of drums 71 and 74 to permit the teeth 72 to draw the formations 77 a greater degree outwardly from the sheet than if the sheet were travelling at the same speed as the drum 71.

In a preferred form of the invention wherein a thermoplastic polymer is employed for the sheet material being processed as described, polyethylene, polyvinyl chloride, polypropylene, styrene-butadiene, ethylene vinyl acetate, polyuretahane and other flexible polymers may be provided in sheet form in the range of 5 mils to 50 mils thick with the filaments or surface formations 12' varying from about 1 mil to 10 mils in mean diameter and from 3 mils to 60 mils or more in height depending on the physical characteristics desired to be imparted to the surface of the sheet. The height of the filament-like formations 12' will be a function of the length and diameter of the penetrating or forming devices such as the needles 45, the degree they penetrate the molten or heat softened surface of the sheet, the physical characteristics of the polymer comprising the sheet be deformed and the degree of its plasticity during the deforming operation. If the sheet is presented to the deforming means so that the surface stratum thereof is rendered molten to the depth of penetration either as a result of its condition as extruded being retained while the other surface of the sheet is cooled to solidify the lower stratum of said sheet, then relatively long filament-like formations such as 55 of FIG. 2 may be formed in the sheet when the penetrating needles leave the sheet. The application of coolant fluid such as a gas stream or streams under pressure to the fiilament-like formations 55 as they are formed may not only be used to cool and solidify the filament-like formations as soon as they are formed to retain their identilty as filaments but may also be such as to substantially affect and to some degree predetermine their shape depending on the velocity of the applied coolant stream.

In practicing any of the described embodiments of the invention, the sheet deforming drum and/or the depressor drum or belt may contain heat transfer means for processing the sheet and preparing it to effect said filament-like forming thereof. For example, the drum 18 of FIG. 2 may be internally heated by resistance heating elements mounted therein so as to render the layer 53 thereof which is to supply the material for the filament like formations in a molten condition as the sheet enters the forming means while the drum 43 may have a refrigerant liquid circulated therethrough to effect cooling of the lower stratum of the sheet to retain same in a solid or set condition.

In the embodiment of the invention shown in FIG. 8, an induction heating means mounted within either or both the power driven drums 71 and 74 may be utilized to heat soften the sheet 75 to a degree as it passes through the deforming drums to facilitate the formation of the teeth or barb-like formations 77 therein.

The induction heating means may be operative to heat the drum or drums engaging the sheet material as well as the sheet deforming rods or pins 45 for softening thermoplastic sheet material. If the sheet material is a thermosetting resin, the heat applied thereto through the drum or auxiliary means disposed adjacent said sheet after it is deformed as described, may be utilized to set the material of said sheet with the protruding sheet deformations retained by said setting action as formed or in a different shape resulting from slumping or flow before setting of the sheet material. If the sheet is made of metal such as aluminum or other metal, induction heating means mounted in either or both the drums or adjacent thereto may be operative to heat and soften said sheet prior to its deformation as shown, for example, in FIG. 8. If the formation 77 so formed are to be utilized for scouring or cutting purposes, the sheet may be further heat treated or said formations 77 may be coated or plated with materials such as tungsten, tungsten carbide, aluminum oxide, boron nitride, or other suitable hard material to render them sufficiently hard surfaced to resist wear and deflection.

By means of a modified form of surface-deforming apparatus as shown in FIG. 9, it is noted that each of the needles 45 of FIG. 2 may be replaced by nozzles 45' operative to eject fine jets of air or other gas at sufficient velocity against the molten sheet material fed closely adjacent thereto for deforming the surface stratum of said material into fine filaments or other irregular formations which protrude outwardly from the sheet and solidify as irregular protrusions 12a to render the surface of said sheet in a pile or other condition. While the nozzle formations may penetrate the sheet in another mode they may merely be moved close to the sheet as shown in FIG. 9 as said sheet passes the drum or they may penetrate said sheet to a greater or lesser depth. An array of stationery nozzles or orifices disposed above and close to the surface of the sheet may also be operative to blow form the softened sheet material into an irregular shape such as a pile-like surface formation with random filament-like formations therein or a porous sheet formation. If the sheet or surface stratum thereof is preheated to a molten condition, the gas or air jets directed thereagainst may be at relatively low temperature or refrigerated so as to immediately solidify the filament or other formations formed of the molten material. If the sheet is supplied to the air jet producing means at ambient temperature or a temperature below which the material is rendered molten, the gas or air directed as jet streams thereagainst may be heated to a degree such as to render the areas of the sheet intersected by the gas jets in a molten condition to permit it to be upwardly or obliquely deformed into filament-like protrusions. By pulsing high velocity streams of said gas into the sheet rendered molten thereby or by previously applied heat, either normal to the sheet or oblique thereto, portions of the material of the sheet may be forced out of the surface stratum as shown in FIG. 9 to form filament-like or other formations therein which solidify thereafter to form permanent protrusions.

What is claimed is:

1. An apparatus for producing a sheet of thermoplastic material having a multitude of cantilevered formations protruding from a major surface of said sheet comprising:
   means for supplying a sheet of thermoplastic material,
   means for rendering at least a portion of said sheet in a thermo-formable condition,
   sheet-forming means for operating on said sheet as it is fed thereto to shape said major surface of said sheet with a multitude of cantilevered formations protruding outwardly from said sheet and supported by the sheet itself,
   means for feeding said sheet from said supply means to said forming means,
   said forming means including tooling having an endless surface,
   a plurality of tooth-like forming means supported by said endless surface with the individual teeth of said forming means protruding outwardly from said outward surface,
   means for compressively forcing said sheet against said forming means as it is fed thereto so as to cause each of said teeth of said forming means to penetrate into a different portion of the thermoformable portion of said sheet,
   means for operating said forming means to cause each of said teeth to be driven out of the material of the sheet penetrated thereby and to lift portions of the thermoformable material of the sheet outwardly from the surface of the sheet without separating the material lifted from the sheet from the sheet itself and,
   means for cooling said sheet to set said portions lifted from said sheet and removing said sheet from said forming means whereby said portions of said sheet lifted from the sheet surface remain permanently deformed and protrude outwardly from the sheet.

2. An apparatus in accordance with claim 1, said forming means including a plurality of drums, one of said drums having a plurality of tooth-like formations connected to the peripheral surface of said drum and protruding outwardly therefrom, each of said tooth-like formations being operative to penetrate a different portion of the sheet as the sheet is driven through said forming means against the surface of the drum, the other of said drums being operative to compress the other surface of said sheet against the drum containing said tooth-like formations, and means for driving said sheet continuously between said drums whereby portions of the material of said sheet are deformed outwardly therefrom along substantially the entire length of the sheet.

3. Apparatus for producing a sheet of material having a multitude of filamentary formations protruding from the major surface of said sheet comprising:
   means for supplying a sheet of deformable material,
   means for rendering the outer stratum of said sheet defining said major surface in a molten condition,
   sheet-forming means for operating on said sheet as it is fed thereto to shape said major surface of said sheet with a multitude of cantilevered formations,
   means for feeding said sheet to said forming means,
   said forming means including means for ejecting a plurality of narrow streams of fluid into said molten outer stratum of said sheet at sufficient velocity to deform and lift portions of the molten material outwardly from said major surface, and
   means for removing said sheet from said forming means whereby said portions of said sheet lifted from the outer stratum of the sheet remain permanently deformed and protrude outwardly from the sheet.

4. An apparatus in accordance with claim 3, whereby said forming means comprises tooling having an endless surface means containing a plurality of nozzles supported by said endless surface and each operative to eject a narrow stream of fluid into said molten portion of said sheet to deform the material thereof and to form filament-like formations thereof.

References Cited

UNITED STATES PATENTS

| | | | |
|---|---|---|---|
| 946,943 | 1/1910 | Maxim | 18—10 |
| 1,921,456 | 8/1933 | De Laney | 18—10UX |
| 3,027,595 | 4/1962 | Takai et al. | 18—10X |
| 3,089,191 | 5/1963 | Conrad | 18—10X |
| 3,116,787 | 1/1964 | Campbell | 18—Extrude & Mold Digest |
| 3,241,182 | 3/1966 | Kessler | 18—10UX |
| 3,312,583 | 4/1967 | Rochlis | 18—10UX |
| 2,068,456 | 1/1937 | Hooper | 18—Perforate Digest |
| 2,724,216 | 11/1955 | Cisne | 18—Perforate Digest |
| 2,748,863 | 5/1958 | Benton | 18—Perforate Digest |
| 2,924,863 | 2/1960 | Chavannes | 18—Perforate Digest |

FOREIGN PATENTS

| | | | |
|---|---|---|---|
| 657,985 | 2/1963 | Canada | 18—10 |

J. SPENCER OVERHOLSER, Primary Examiner

J. E. ROETHEL, Assistant Examiner